United States Patent
Isomura et al.

(10) Patent No.: US 9,039,926 B2
(45) Date of Patent: May 26, 2015

(54) PRODUCTION PROCESS FOR COMPOSITE OXIDE, POSITIVE-ELECTRODE ACTIVE MATERIAL FOR LITHIUM-ION SECONDARY BATTERY AND LITHIUM-ION SECONDARY BATTERY

(75) Inventors: Ryota Isomura, Kariya (JP); Hitotoshi Murase, Kariya (JP); Naoto Yasuda, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 172 days.

(21) Appl. No.: 13/577,523

(22) PCT Filed: Feb. 7, 2011

(86) PCT No.: PCT/JP2011/000666
§ 371 (c)(1),
(2), (4) Date: Aug. 7, 2012

(87) PCT Pub. No.: WO2011/096236
PCT Pub. Date: Aug. 11, 2011

(65) Prior Publication Data
US 2012/0321954 A1    Dec. 20, 2012

(30) Foreign Application Priority Data
Feb. 8, 2010 (JP) .................. 2010-025121

(51) Int. Cl.
*H01M 4/88* (2006.01)
*H01M 4/505* (2010.01)
(Continued)

(52) U.S. Cl.
CPC .......... *H01M 4/505* (2013.01); *C01G 45/1228* (2013.01); *C01P 2002/72* (2013.01);
(Continued)

(58) Field of Classification Search
CPC .... C01G 45/1228; C01G 53/00; H01M 4/505
USPC .............. 252/182.1, 518.1, 519.15; 423/599; 429/219–221, 224, 332
See application file for complete search history.

(56) References Cited

U.S. PATENT DOCUMENTS 5,780,181 A * 7/1998 Idota et al. .................... 429/332
6,117,410 A   9/2000 Ogihara et al.
2003/0124423 A1* 7/2003 Sasaki et al. .................. 429/221

FOREIGN PATENT DOCUMENTS

CN     1074629 A     7/1993
CN     1232438 A    10/1999
(Continued)

OTHER PUBLICATIONS

Chang et al., The synthesis of Li(Ni1/3Co1/3Mn1/3)O2 using euthectic mixed lithium salt LiNO3—LiOH, Electrochimica Acta, 54, (2009), pp. 6529-6535.*

(Continued)

*Primary Examiner* — Khanh Tuan Nguyen
(74) *Attorney, Agent, or Firm* — Sughrue Mion, PLLC

(57) ABSTRACT

A production process for composite oxide expressed by a compositional formula: $LiMn_{1-x}A_xO_2$, where "A" is one or more kinds of metallic elements other than Mn; and $0 \leq "x" < 1$, obtained by preparing a raw-material mixture by mixing a metallic-compound raw material and a molten-salt raw material with each other, the metallic-compound raw material at least including an Mn-containing nitrate that includes one or more kinds of metallic elements in which Mn is essential, the molten-salt raw material including lithium hydroxide and lithium nitrate, and exhibiting a proportion of the lithium nitrate with respect to the lithium hydroxide (Lithium Nitrate/Lithium Hydroxide) that falls in a range of from 1 or more to 3 or less by molar ratio; reacting the raw-material mixture at 500° C. or less by melting it; and recovering the composite oxide being generated from the raw-material mixture that has undergone the reaction.

5 Claims, 2 Drawing Sheets

(51) Int. Cl.
*C01G 45/12* (2006.01)
*B82Y 30/00* (2011.01)
*H01M 10/0525* (2010.01)

(52) U.S. Cl.
CPC ........ *C01P2006/40* (2013.01); *H01M 10/0525* (2013.01); *Y02E 60/122* (2013.01); *Y02T 10/7011* (2013.01); *C01P 2002/54* (2013.01); *C01P 2002/76* (2013.01); *C01P 2004/61* (2013.01); *C01P 2004/64* (2013.01); *H01M 2220/20* (2013.01); *B82Y 30/00* (2013.01)

(56) References Cited

FOREIGN PATENT DOCUMENTS

| CN | 1493522 | A | 5/2004 | | |
|---|---|---|---|---|---|
| JP | 10-330118 | A | 12/1998 | | |
| JP | 2000-251886 | A | 9/2000 | | |
| JP | 2001-192210 | A | 7/2001 | | |
| JP | 2002-075358 | A | 3/2002 | | |
| JP | 2003-048718 | | * | 2/2003 | ............ C01G 53/00 |
| JP | 2003-048718 | A | 2/2003 | | |
| JP | 2003-123756 | A | 4/2003 | | |
| JP | 2008-105912 | A | 5/2008 | | |
| JP | 4244427 | B2 | 3/2009 | | |

OTHER PUBLICATIONS

Shinichi Komaba et al., "Hydrothermal Synthesis of High Crystalline Orthorhombic $LiMnO_2$ as a Cathode Material for Li-ion Batteries", Solid State Ionics, Dec. 2002, pp. 311-318, vol. 152-153.

International Search Report of PCT/JP2011/000666 dated Mar. 15, 2011.

Chinese Office Action with Search Report for corresponding CN Patent Application No. 201180008594.5 issued on Nov. 1, 2013.

* cited by examiner

PRODUCTION PROCESS FOR COMPOSITE OXIDE, POSITIVE-ELECTRODE ACTIVE MATERIAL FOR LITHIUM-ION SECONDARY BATTERY AND LITHIUM-ION SECONDARY BATTERY

CROSS REFERENCE TO RELATED APPLICATIONS

This application is a National Stage of International Application No. PCT/JP2011/000666 filed Feb. 7, 2011, claiming priority based on Japanese Patent Application No. 2010-025121 filed Feb. 8, 2010, the contents of all of which are incorporated herein by reference in their entirety.

TECHNICAL FIELD

The present invention is one which relates to a composite oxide that is employed as a positive-electrode material for lithium-ion secondary battery, and to a lithium-ion secondary battery that uses that composite oxide.

BACKGROUND ART

Recently, as being accompanied by the developments of portable electronic devices such as cellular phones and notebook-size personal computers, or as being accompanied by electric automobiles being put into practical use, and the like, small-sized, lightweight and high-capacity secondary batteries have been required. At present, as for high-capacity secondary batteries meeting these demands, non-aqueous secondary batteries have been commercialized, non-aqueous secondary batteries in which lithium cobaltate (e.g., $LiCoO_2$) and the carbon-system materials are used as the positive-electrode material and negative-electrode material, respectively. Since such a non-aqueous secondary battery exhibits a high energy density, and since it is possible to intend to make it downsize and lightweight, its employment as a power source has been attracting attention in a wide variety of fields. However, since $LiCoO_2$ is produced with use of Co, one of rare metals, as the raw material, it has been expected that its scarcity as the resource would grow worse from now on. In addition, since Co is expensive, and since its price fluctuates greatly, it has been desired to develop positive-electrode materials that are inexpensive as well as whose supply is stable.

Hence, it has been regarded promising to employ lithium-manganese-oxide-system composite oxides whose constituent elements are inexpensive in terms of the prices as well as which include stably-supplied manganese (Mn) in their essential compositions. Orthorhombic-system $o-LiMnO_2$ is a compound that has charging/discharging profiles in 4-V region and 3-V region, respectively. The charging/discharging behavior of lithium-ion secondary battery at room temperature, lithium-ion secondary battery in which the orthorhombic-system $o-LiMnO_2$ is used as the positive-electrode active material, is introduced in Non-patent Literature No. 1, and the like. According to this literature, the lithium-ion secondary battery in which the $o-LiMnO_2$ is used exhibits such a behavior that it has a very small capacity (e.g., at around 50 mAh/g) in the beginning of charging/discharging and the capacity reaches a maximum capacity (e.g., 100 mAh/g or more) by repeating the charging and discharging up to a few dozens of cycles more or less. However, no such batteries whose capacities are low up until arriving at higher cycles have been desired practically.

Moreover, although it has been known that the electrochemical characteristics of $LiMnO_2$ depends on the synthesis methods, the synthesis is difficult compared with those of the other composite oxides. For example, in Patent Literature No. 1, a non-aqueous-system secondary battery exhibiting a high capacity relatively, non-aqueous-system secondary battery in which $LiMnO_2$ is used as the positive-electrode active material, is disclosed. Here, $LiMnO_2$ is synthesized by heat-treating a pellet, which comprises an $MnCO_3$ powder and an $Li_2CO_3$ powder, at 1,000° C. for 12 hours and then cooling it rapidly. Moreover, although another synthesis process, in which reactions are caused at low temperatures relatively with use of hydrothermal treatment, has also been known, no sufficient capacity is obtainable even when the thus obtained $LiMnO_2$ is employed in lithium-ion secondary batteries. Although it is useful industrially if it is possible to synthesize $LiMnO_2$, which brings about higher capacity, at a lower temperature and for a shorter period of time, it is the actual situation that no such a synthesis process has been established yet.

Moreover, in positive-electrode active materials for lithium-ion secondary battery, many of them are those in which the diffusion rates of lithium ion within their composite oxides are small relatively. As one of means for charging and discharging such composite oxides at a faster rate by letting lithium ions come in and go from out of them in a short period of time, it is possible to think of making the composite oxides' particle diameters smaller. Consequently, it has been needed to develop a simple and easy synthesis process for fine particles. For example, in Patent Literature No. 2, a process for synthesizing nano-order oxide particles is disclosed. In Example No. 3 of Patent Literature No. 2, $MnO_2$ including tetravalent Mn, and $Li_2O$ are added to and are then mixed with a mixture, in which $LiOH_2H_2O$ and $LiNO_3$ are mixed in a molar ratio of 1:1, thereby synthesizing lithium manganate being expressed by $LiMn_2O_4$ whose manganese has an average oxidation number that is equal to a valence number of 3.5, by turning the mixture into molten salt after letting the mixture go through a drying step.

RELATED TECHNICAL LITERATURE

Patent Literature

Patent Literature No. 1: Japanese Patent Gazette No. 4,244,427; and
Patent Literature No. 2: Japanese Unexamined Patent Publication (KOKAI) Gazette No. 2008-105,912

Non-Patent Literature

Non-patent Literature No. 1: Komaba et al., "Hydrothermal Synthesis of High Crystalline Orthorhombic $LiMnO_2$ as a Cathode Material for Li-ion Batteries," Solid State Ionics 152-153 (2002), 311-318

SUMMARY OF THE INVENTION

Assignment to be Solved by the Invention

As described above, although fine-particle-shaped $LiMnO_2$ has been sought for, only $LiMnO_2$, which has particle diameters that are the same extent as those of the raw-material powders, is obtainable by the method according to Patent Literature No. 1. Moreover, in accordance with the production process according to Patent Literature No. 2, although it is possible to produce nano-order fine particles, it has not been possible to make $LiMnO_2$.

In view of the aforementioned problematic issues, the present invention aims at providing a novel production process that makes it possible to simply and easily synthesize $LiMnO_2$, and composite oxide whose essential composition is made of the former. Moreover, it aims at providing a positive-electrode active material including a composite oxide that is obtainable by means of this novel production process, and a lithium-ion secondary battery using the same.

Means for Solving the Assignment

A production process for composite oxide according to the present invention is characterized in that:

it is a production process for composite oxide said composite oxide is obtained via the following:

it is a production process for composite oxide being expressed by a compositional formula: $LiMn_{1-x}A_xO_2$ (where "A" is one or more kinds of metallic elements other than Mn; and $0 \leq \text{"x"} \leq 1$);

said composite oxide is obtained via the following:

a raw-material mixture preparation step of preparing a raw-material mixture by mixing a metallic-compound raw material and a molten-salt raw material with each other, the metallic-compound raw material at least including an Mn-containing nitrate that includes one or more kinds of metallic elements in which Mn is essential, the molten-salt raw material including lithium hydroxide and lithium nitrate, and exhibiting a proportion of the lithium nitrate with respect to the lithium hydroxide (i.e., (Lithium Nitrate)/(Lithium Hydroxide)) that falls in a range of from 1 or more to 3 or less by molar ratio;

a molten reaction step of reacting said raw-material mixture at 500° C. or less by melting it: and a recovery step of recovering said composite oxide being generated from said raw-material mixture that has undergone the reaction.

In the production process for composite oxide according to the present invention, the following are used as the raw-material mixture: a "metallic-compound raw material" including at least an Mn-containing nitrate that includes one or more kinds of metallic elements in which Mn is essential; and a "molten-salt raw material" that includes lithium hydroxide and lithium nitrate. Composite oxides being expressed by the above-mentioned compositional formula are obtainable by not only using the nitrate as a raw material for supplying Mn (i.e., the metallic-compound raw material) but also preparing the molten-salt raw material so that the ratio, namely, (Lithium Nitrate)/(Lithium Hydroxide), becomes from 1 or more to 3 or less by molar ratio, and by further reacting the raw-material mixture at 500° C. or less.

Reasons why desirable composite oxides are obtainable by reacting the raw-material mixture, in which the ingredients have been mixed in the aforementioned proportion, at the aforementioned temperatures can be presumed as follows. It is believed that the compositions of obtainable composite oxides are subject to the properties of molten salts (e.g., whether they are acidic or they are basic) and the reaction temperatures. For example, in the synthesis of composite oxides including Mn, it is not possible to synthesize composite oxides including trivalent Mn like $LiMnO_2$ because Mn takes on tetravalene with ease in a case where it is in a highly oxidizing condition and exhibits high reaction activity. In the production process according to the present invention, however, it is possible to adjust the property of molten salt because lithium hydroxide and lithium nitrate are used combinedly as the raw-material mixture including Li. When the ratio, namely, (Lithium Nitrate)/(Lithium Hydroxide), falls in a range of from 1 or more to 3 or less by molar ratio, and at the same time when the reaction temperature is 500° C. or less, a lower oxidizing condition and lower reaction activity are obtainable, and thereby it is possible to readily synthesize composite oxides including trivalent Mn in which $LiMnO_2$ makes the essential composition. On this occasion, it is believed that using a nitrate as the metallic-compound raw material results in progressing the reaction under stable conditions without ever adversely affecting the balance between lithium hydroxide and lithium nitrate.

In the production process according to the present invention, it is not needed to heat the raw materials up to considerably high temperatures (for example, at around 1,000° C.) when the raw materials are in a state of the molten salt. Moreover, no long time is required for the reaction. Consequently, it is feasible to synthesize composite oxides with good efficiency. To be concrete, it is allowable that the molten reaction step can be done at 300° C. for from 1 to 2 hours approximately.

In addition, in accordance with the production process according to the present invention, fine-particle-shaped composite oxides are obtainable by means of turning the raw-material mixture into molten salt and then reacting the raw materials in the resulting molten salt. This is because the reactions of the raw materials, which are mixed uniformly in ionic states within the molten salt, proceed at low temperatures and for a short period of time.

Moreover, it is also allowable to carry out a mixed-nitrate aqueous-solution preparation step, in which an aqueous solution of nitrate including at least two kinds of metallic elements is prepared, before the raw-material mixture preparation step in the production process for composite oxide according to the present invention, and then to employ said metallic-compound raw material including the resulting aqueous solution at the raw-material mixture preparation step. Composite oxides, which include, together with Li, one or more kinds of metallic elements and Mn are obtainable in high purity by using the mixed-nitrate aqueous solution as the metallic-compound raw material.

Composite oxides, which are obtainable by means of the production process for composite oxide according to the present invention, can be employed as a positive-electrode active material for lithium-ion secondary battery. That is, it is also possible to grasp the present invention as a positive-electrode active material for lithium-ion secondary battery that is characterized in including a composite oxide that is obtained by means of the production process for composite oxide according to the present invention. Since the composite oxides, which are obtainable by means of the production process according to the present invention, are very fine, a lithium-ion secondary battery, which employs the positive-electrode active material for lithium-ion secondary battery according to the present invention, exhibits a high capacity from the initial stage of charging/discharging.

A composite oxide being included in a positive-electrode active material for lithium-ion secondary battery according to the present invention is expressed by a compositional formula: $LiMn_{1-x}A_xO_2$ (where "A" is one or more kinds of metallic elements other than Mn; $0 \leq \text{"x"} < 1$; and Li may even be substituted by hydrogen in a part thereof). $LiMnO_2$, namely, the essential composition of a composite oxide that is included in the positive-electrode active material for lithium-ion secondary battery according to the present invention, possesses an orthorhombic-system lamellar structure, and so an average oxidation number of the Mn is trivalent basically.

However, since the composite oxide may possibly have a composition that deviates from this basic composition slightly, it is permissible that an average oxidation number can fall in a range of from 2.0 and up to 4.0 in the composite oxide as a whole. Desirably, it can fall in a range of from 2.8 to 3.2. Note that it is needless to say that the positive-electrode active material for lithium-ion secondary battery according to the present invention also includes composite oxides whose compositions have deviated slightly from the aforementioned compositional formula due to the deficiency, or the like, in Li, Mn, "A" or O that occurs inevitably.

Effect of the Invention

In accordance with the present invention, it is possible to simply and easily synthesize $LiMnO_2$, and composite oxide, in which the former makes the essential composition.

MODES FOR CARRYING OUT THE INVENTION

Figure 1:
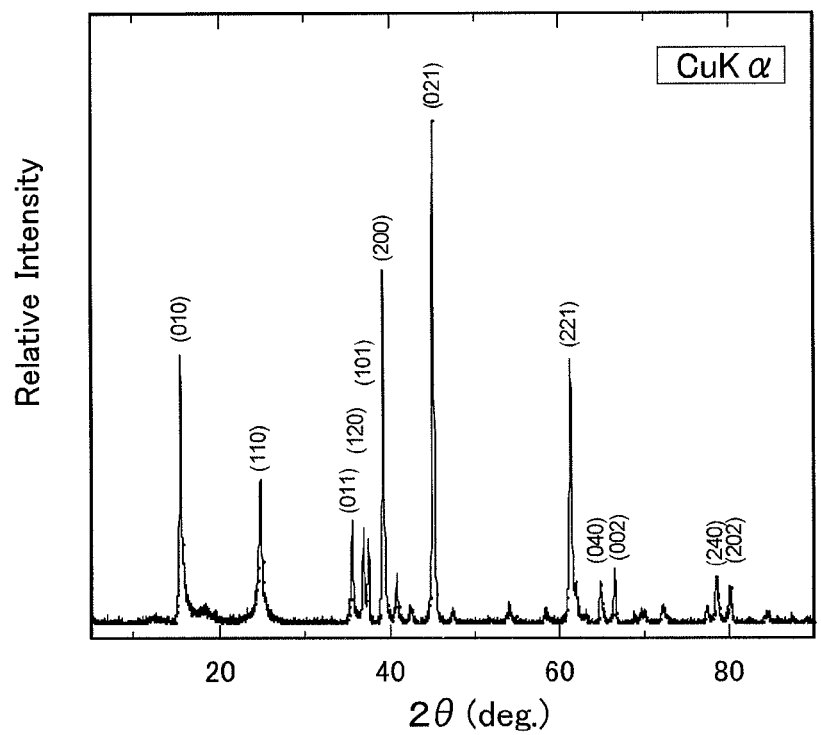
FIG. 1 illustrates a result of an X-ray diffraction measurement on a composite oxide that was produced by means of a production process for composite oxide according to the present invention.

Hereinafter, explanations will be made on some of the modes for performing the production process for composite oxide, positive-electrode active material for lithium-ion secondary battery and lithium-ion secondary battery according to the present invention. Note that, unless otherwise specified, ranges of numeric values, namely, "from 'a' to 'b'" being set forth in the present description, involve the lower limit, "a," and the upper limit, "b," in those ranges. And, the other ranges of numeric values are composable by arbitrarily combining not only any two of these upper-limit values and lower-limit values but also any two of those involving the numeric values that are listed in specific examples.

Composite Oxide

Hereinafter, the respective steps of a production process for composite oxide according to the present invention will be explained. The production process for composite oxide according to the present invention is a production process for composite oxide being expressed by a compositional formula: $LiMn_{1-x}A_xO_2$ (where "A" is one or more kinds of metallic elements other than Mn; $0 \leq "x" < 1$; and Li may even be substituted by hydrogen in a part thereof); the production process mainly includes a raw-material mixture preparation step, a molten reaction step, and a recovery step; and it can further include a mixed-nitrate aqueous-solution preparation step, and so on, if needed.

In the raw-material mixture preparation step, a raw material mixture, which includes a metallic-compound raw material mixture and a molten-salt raw material at least, is prepared. The metallic-compound raw material includes a metallic compound that at least includes an Mn-containing nitrate including one or more metallic elements in which Mn is essential. The molten-sale raw material includes lithium hydroxide and lithium nitrate.

As for a raw material for supplying Mn, a metallic compound, which at least includes an Mn-containing nitrate including one or more kinds of metallic elements in which Mn is essential, is used. To be concrete, the following are given: manganese nitrate $(Mn(NO_3)_2 \cdot 6H_2O)$; or metallic compounds in which a part of Mn in manganese nitrate is substituted by Al, Ni, Co, Mg, Ca, Ti, Zn, Cu or Fe, and the like, for instance; and so forth. It is allowable to use one kind or two or more kinds of these as an essential metallic compound, respectively. Although it does not matter that the Mn-containing nitrate can be either solid or liquid (e.g., aqueous solution), $Mn(NO_2)_2 \cdot 6H_2O$ is preferable because not only it can be procured easily but also ultra-fine particles are likely to be generated due to being liquid. Here, Mn in the metallic compounds does not necessarily need to be trivalent, but it is permissible that it can be Mn with a valence number of 3 or less. This is due to the fact that even divalent Mn, for instance, turns into being trivalent one at the least because reactions proceed in low oxidizing conditions. This holds true similarly for the transition elements that substitute for Mn, too.

Note that, in accordance with the production process according to the present invention, it is also possible to produce the composite oxides in which a part of Mn is substituted by the other metallic elements (i.e., "A" in the compositional formula). If such is the case, it is allowable to further employ a second nitrate, which includes one or more kinds of metallic elements (i.e., "A") from which Mn is excluded, as the metallic-compound raw material, in addition to the above-mentioned Mn-containing nitrate. As for a specific example of the second nitrate, the following can be given: cobalt nitrate $(Co(NO_2)_2 \cdot 6H_2O)$; nickel nitrate $(Ni(NO_2)_2 \cdot 6H_2O)$; aluminum nitrate $(Al(NO_2)_2 \cdot 9H_2O)$; or copper nitrate $(Cu(NO_2)_2 \cdot 3H_2O)$; and the like. It is permissible to use one kind or two or more kinds of these as the second nitrate.

Moreover, it is allowable to preliminary synthesize in advance a nitrate, which includes two or more kinds of metallic elements that may even include Mn as well (to put it differently, which includes an Mn-containing nitrate and/or a second nitrate), as a precursor (i.e., a mixed-nitrate aqueous solution). That is, it is permissible to carry out, before the raw-material mixture preparation step, a mixed-nitrate aqueous-solution preparation step in which a nitrate aqueous solution including at least two kinds of metallic elements is prepared.

Note that it is allowable to turn these nitrates into an aqueous solution and then blend them into the raw-material mixture. This is due to the fact that ultra-fine particles of the composite oxides become likely to be generated by dissolving the nitrates in water.

Moreover, as raw materials for supplying Li, lithium hydroxide and lithium nitrate are used. Lithium nitrate is adopted because it is a lithium salt with low melting point and it is unlikely to make impurities remain in composite oxides to be produced. Lithium hydroxide is employed in order to adjust the oxidizing power of the resulting molten salt by employing it in an adequate amount because the basicity is high. Note that, as the lithium hydroxide, it is allowable either to use its anhydrides, or to use its hydrates. That is, as for an employable lithium hydroxide, LiOH (i.e., anhydride), $LiOH \cdot H_2O$ (i.e., hydrate), and the like, can be given.

At the raw-material mixture preparation step, lithium hydroxide and lithium nitrate are mixed with each other, along with the aforementioned metallic compound, so as to make a proportion of lithium nitrate with respect to lithium hydroxide (i.e., (Lithium Nitrate)/(Lithium Hydroxide)) 1 or more to 3 or less by molar ratio, thereby preparing a raw-material mixture. As for a mixing proportion, it is desirable that it can be from 1.1 or more to 2.7 or less by a molar ratio of (Lithium Nitrate)/(Lithium Hydroxide); it is further desirable that it can be from 1.2 or more to 2.5 or less, furthermore from 1.3 or more to 2 or less. This is due to the fact that, when the mixing ratio is less than 1, the oxidizing power of the resulting molten salt becomes too high so that composite oxides including Mn whose valence exceeds trivalent (for example, $Li_2MnO_3$, $LiMn_2O_4$, and the like) become likely to be generated. Although the greater the content of lithium nitrate is the more likely it is to obtain desired composite oxides, as such is not desirable because the resultant reaction activity declines so that impurities have intermingled or a high-temperature and/or long-time molten reaction step has become needed when the mixing ratio exceeds 3.

As described above, the molten-salt raw material brings about desirable oxidizing conditions for generating desired composite oxides due to the setup that lithium hydroxide and lithium nitrate fall in the above-mentioned mixing proportion. Consequently, it is needless to say that it is desirable to keep away from employing other compounds that affect the oxidizing condition of the resulting molten salt. For example, lithium peroxide ($Li_2O_2$) is not desirable since it is unstable in air and is a strong oxidizing agent so that it has greatly changed the oxidizing conditions that are to be adjusted by means of the mixing proportions between lithium hydroxide and lithium nitrate.

Moreover, it is also feasible to change the particle diameters of obtainable composite oxides by changing a mixing proportion in the molten-salt raw material. For example, in molten-salt reactions at identical temperatures, the smaller the molar ratio of (Lithium Nitrate)/(Lithium Hydroxide) becomes the more feasible it is to make the particle diameters of particles to be synthesized smaller.

Moreover, it is allowable that a blending proportion of the above-mentioned metallic-compound raw material and molten-salt raw material can suitably be selected in compliance with proportions of Li and Mn that are included in composite oxides to be produced, as well as those of the other metallic elements, if needed. When defining it daringly, it is permissible to set a proportion of metallic element being included in the metallic-compound raw material with respect to lithium metal being included in the molten-salt raw material (i.e., (Metallic Element in Metallic-compound Raw Material)/ (Lithium Metal in Molten-salt Raw Material)) at from 0.01 or more to 0.2 or less by molar ratio. Since the amounts of generating composite oxides become less with respect to the employed amounts of the molten-salt raw material when it is less than 0.01, as such is not desirable in the aspect of production efficiency. Moreover, since the amounts of molten salt for dispersing the metallic-compound raw material have run short and so the resulting composite oxides might possibly agglomerate or undergo granular growths within the molten salt when it exceeds 0.2, as such is not desirable. A further desirable proportion of the (Metallic Element in Metallic-compound Raw Material)/(Lithium Metal in Molten-salt Raw Material) can be from 0.01 to 0.15, or from 0.013 to 0.1, furthermore from 0.015 to 0.08, by molar ratio.

Moreover, it is also feasible to define the above-mentioned blending proportion of the molten-salt raw material by the theoretical compositions of lithium being included in targeted composite oxides with respect to lithium being included in the molten-salt raw material (i.e., (Li in Composite Oxide)/ (Li in Molten-salt Raw Material)). The molten-salt raw material not only accomplishes a role of a supply source for lithium but also accomplishes a role of adjusting the oxidizing condition of molten salt. Consequently, it is desirable that the molten-salt raw material can include lithium in an amount that exceeds the theoretical compositions of lithium being included in composite oxides to be produced. Although it is allowable that the ratio, (Li in Composite Oxide)/(Li in Molten-salt Raw Material), can be less than 1 by molar ratio, it is preferable to be from 0.01 to 0.2, and it is further preferable to be from 0.013 to 0.1, or from 0.015 to 0.08. Since the amounts of generating composite oxides become less with respect to the employed amounts of the molten-salt raw material when it is less than 0.01, as such is not desirable in the aspect of production efficiency. Moreover, since the amount of molten salt for dispersing the metallic-compound raw material has run short and so the resulting composite oxides might possibly agglomerate or undergo granular growths within the molten salt when it exceeds 0.4, as such is not desirable.

Moreover, it is allowable to carry out a drying step of drying the raw-material mixture after the raw-material mixture preparation step, but before the molten reaction step. When using a vacuum drier for the drying, it is permissible to vacuum dry the raw-material mixture at from 80 to 150° C. for from 2 to 24 hours. Water, which exists within molten salt comprising the molten-salt raw material that includes lithium hydroxide, exhibits a pH that is enhanced very much. When the molten reaction step is carried out in the presence of water with high pH, there might arise such a possibility that the components of crucible are eluted into the resulting molten salt by means of that water coming in contact with the crucible, although, in a trace amount, depending on the types of the crucible. Since the water content in the raw-material mixture is removed at the drying step, this leads to inhibiting crucibles' components from eluting. Note that, in a case where anhydrous lithium hydroxide is employed as the lithium hydroxide, a similar advantageous effect is obtainable even when omitting the drying step. Moreover, it is possible to prevent water from boiling to result in dissipating the resultant molten salt in the molten reaction step by means of removing water from the raw-material mixture in the drying step.

The molten reaction step is a step in which the raw-material mixture is melted to react it. The reaction temperature is a temperature of the raw-material mixture at the molten reaction step; although it can be a melting point or more of the molten-salt raw material, for the reaction activity of the resulting molten salt becomes excessive when it exceeds 500° C. so that composite oxides including Mn whose valence exceeds trivalent become likely to be generated. Moreover, since lithium nitrate decomposes violently when it becomes high temperatures (e.g., about 600° C.), it is possible to carry out the synthesis of composite oxides under stable conditions when being 500° C. or less. In addition, when the reaction temperature is 500° C. or less, the resultant orthorhombic-system crystal structure stabilizes. Although a desirable reaction temperature depends on types of the raw-material mixture, it can be from a melting point or more of the raw-material mixture to 500° C. or less, or from 260° C. or more to 450° C. or less, furthermore from 280° C. or more to 400° C. or less. When employing manganese nitrate alone as the metallic compound, it is desirable that the reaction temperature can fall in a range of from 260° C. to 350° C. When the raw-material mixture is retained at such a temperature for 30 minutes or more, further desirably for from 45 minutes to 2 hours, it reacts sufficiently. Although it is allowable to carry out the molten reaction step in air, it is desirable to carry it out in an atmosphere whose oxygen-gas concentration is low, such as in inert gases.

Moreover, there are not any limitations on a cooling rate for the raw-material mixture after the molten reaction step especially. When defining it concretely, it is desirable to carry out cooling at a rate of from 0.5 to 5° C./minute, furthermore from 1 to 3° C./minute, until a temperature of the post-molten-reaction-step raw-material mixture becomes a temperature at which molten salt solidifies, namely, 200° C. or less, for instance.

The recovery step is a step of recovering a composite oxide that is generated from the post-reaction raw-material mixture (or molten salt). There are not any limitations on the recovery method especially; however, since composite oxides, which have been generated at the molten reaction step, are insoluble in water, the resulting molten salt is cooled sufficiently to solidify in order to turn it into solid, then the resultant solid is dissolved in water, and thereby the composite oxides are obtainable as insoluble substances. Thus, it is allowable to take out the resulting composite oxides by drying filtered substances that have been obtained by filtering the resultant aqueous solution.

Moreover, after the recovery step, it is also allowable to carry a proton substitution step in which hydrogen (H) substitutes for a part of Li in the resulting composite oxides. In the proton substitution step, a part of Li in the resultant post-recovery-step composite oxides can be replaced readily by H by means of contacting the composite oxides with a solvent such as a diluted acid.

Note that, when heat-treating composite oxides being obtained by means of the production process according to the present invention, they might possibly change into spinel-structured $LiMn_2O_4$, and the like, depending on the conditions. Consequently, in the production process according to the present invention, it is less preferred to carryout a treatment for heating them to high temperatures that follows the reaction step.

A composite oxide, which has been obtained by means of the production process according to the present invention that has been described in detail so far, is expressed by a compositional formula: $LiMn_{1-x}A_xO_2$ (where "A" is one or more kinds of metallic elements other than Mn; 0≤"x"<1; and Li may even be substituted by hydrogen in a part thereof), and has a crystal structure that belongs to an orthorhombic-system space group. It is possible to ascertain the composition and structure of the composite oxide by means of X-ray diffraction (or XRD), electron-beam diffraction, and the like. However, the composite oxide, which has been obtained by means of the production process according to the present invention, has characteristics that are different from those of composite oxides that have been produced by the other production processes but possess the same composition as that of the above. Hereinafter, those characteristics will be listed.

It is allowable that the composite oxide can include single-crystalline primary particles. It is possible to ascertain that the primary particles are virtually single crystal by means of high-resolution image by TEM. Moreover, it is permissible that the particle diameters of the primary particles in the composite oxide can be 300 nm or less than 200 nm, or 150 nm or less, furthermore from 10 to 100 nm. Although detailed descriptions will be made later on a measurement of the particle diameters, it is feasible to measure them with use of high-resolution image by TEM. It is also possible to define the primary particle diameters from XRD. It is allowable that the composite oxide can include single-crystalline primary particles whose b-axis-direction particle diameters being calculated by means of the Scherrer equation are 200 nm or less. Preferable b-axis-direction particle diameters of the primary particles in the composite oxide can be 100 nm or less, or from 5 to 100 nm, furthermore from 10 to 50 nm, according to the Scherrer equation. Note that a half-value width is taken as a value that is measured at the position of an intensity that is calculated by $I_{max}/2$ when the maximum intensity of (010) in $LiMnO_2$, which can be seen in the vicinity of 15.4-degree diffraction angle (2θ, CuKα ray used), is labeled the "$I_{max}$" As described earlier, the smaller the primary particle diameters are the more likely it is that they can be activated; however, their crystal structures become likely to collapse due to charging and discharging so that the resulting battery characteristics might possibly decline when being too small, and accordingly as such is not preferable.

The composite oxides are expressed by a compositional formula: $LiMn_{1-x}A_xO_2$ (where "A" is one or more kinds of metallic elements other than Mn; 0≤"x"<1; and Li may even be substituted by hydrogen in a part thereof). It is also allowable that Li can be substituted by H in an amount of 60% or less, furthermore 45% or less, by atomic ratio. Moreover, from a standpoint of the stability of crystal structure, it is preferable that a value of "x" (being equivalent to a substitution ratio of Mn) can be 0≤"x"≤0.5 (i.e., from 0 to 50% by the substitution ratio), furthermore 0≤"x"≤0.3 (i.e., from 0 to 30% by the substitution ratio). As for metallic elements being expressed by "A," it is preferable that they can be selected from transition metals from a viewpoint of chargeable/dischargeable capacity in a case where they are made into electrode materials; alternatively, it is preferable that they can be selected from the group consisting of Al, Ni, Co, Fe, Mg, and Ti.

Lithium-Ion Secondary Battery

It is possible to use the composite oxides, which have been obtained by means of the production process according to the present invention, as a positive-electrode active material for non-aqueous electrolyte secondary battery, for example, for lithium-ion secondary battery, respectively. Hereinafter, explanations will be made on a lithium-ion secondary battery using a positive-electrode active material for lithium-ion secondary battery that includes one of the aforementioned composite oxides. This lithium-ion secondary battery is mainly equipped with a positive electrode, a negative electrode, and a non-aqueous electrolyte. Moreover, in the same manner as common lithium-ion secondary batteries, it is further equipped with a separator, which is held between the positive electrode and the negative electrode.

The positive electrode includes a positive-electrode active material into which lithium ions can be inserted and from which they can be extracted, and a binding agent that binds the positive-electrode active material together. It is also allowable that it can further include a conductive additive. The positive-electrode active material includes one of the above-mentioned composite oxides independently. Alternatively, it is even permissible that the positive-electrode active material can further include one or more kinds of the other positive-electrode active materials being selected from the group consisting of $LiCoO_2$, $LiNi_{1/3}Co_{1/3}Mn_{1/3}O_2$, LiMn$_2$O$_4$, S, and the like, which have been used for common lithium-ion secondary batteries, along with one of the aforementioned composite oxides.

Moreover, there are not any limitations especially on the binding agent and conductive additive, and so they can be those which are employable in common lithium-ion secondary batteries. The conductive additive is one for securing the electric conductivity of electrode, and it is possible to use for the conductive additive one kind of carbon-substance powders, such as carbon blacks, acetylene blacks and graphite, for instance; or those in which two or more kinds of them have been mixed with each other. The binding agent is one which accomplishes a role of fastening and holding up the positive-electrode active material and the conductive additive together, and it is possible to use for the binding agent the following: fluorine-containing resins, such as polyvinylidene fluoride, polytetrafluoroethylene and fluororubbers; or thermoplastic resins, such as polypropylene and polyethylene, and the like, for instance.

The negative electrode to be faced to the positive electrode can be formed by making metallic lithium, namely, a negative-electrode active material, into a sheet shape. Alternatively, it can be formed by press-bonding the one, which has been made into a sheet shape, onto a current-collector net, such as nickel or stainless steel. Instead of metallic lithium, it is possible to use lithium alloys or lithium compounds as well. Moreover, in the same manner as the positive electrode, it is also allowable to employ a negative electrode comprising a negative-electrode active material, which can absorb lithium ions and from which they can be desorbed, and a binding agent. As for a negative-electrode active material, it is possible to use the following: natural graphite; artificial graphite; organic-compound calcined bodies, such as phenolic resins; and powders of carbonaceous substances, such as cokes, for instance. As for a binding agent, it is possible to use fluorine-containing resins, thermoplastic resins, and the like, in the same manner as the positive electrode.

It is common that the positive electrode and negative electrode are made by adhering an active-material layer, which is made by binding at least a positive-electrode active material or negative-electrode active material together with a binding agent, onto a current collector. Consequently, the positive electrode and negative electrode can be formed as follows: a composition for forming electrode mixture-material layer, which includes an active material and a binding agent as well as a conductive additive, if needed, is prepared; the resulting composition is applied onto the surface of a current collector after an appropriate solvent has been further added to the resultant composition to make it pasty, and is then dried thereon; and the composition is compressed in order to enhance the resulting electrode density, if needed.

For the current collector, it is possible to use meshes being made of metal, or metallic foils. As for a current collector, porous or nonporous electrically conductive substrates can be given, porous or nonporous electrically conductive substrates which comprise: metallic materials, such as stainless steels, titanium, nickel, aluminum and copper; or electrically conductive resins. As for a porous electrically conductive substrate, the following can be given: meshed bodies, netted bodies, punched sheets, lathed bodies, porous bodies, foamed bodies, formed bodies of fibrous assemblies like nonwoven fabrics, and the like, for instance. As for a nonporous electrically conductive substrate, the following can be given: foils, sheets, films, and so forth, for instance. As for an applying method of the composition for forming electrode mixture-material layer, it is allowable to use a method, such as doctor blade or bar coater, which has been heretofore known publicly.

As for a solvent for viscosity adjustment, the following are employable: N-methyl-2-pyrrolidone (or NMP), methanol, methyl isobutyl ketone (or MIBK), and the like.

As for an electrolyte, it is possible to use organic-solvent-system electrolytic solutions, in which an electrolyte has been dissolved in an organic solvent, or polymer electrolytes, in which an electrolytic solution has been retained in a polymer, and the like. Although the organic solvent, which is included in that electrolytic solution or polymer electrolyte, is not at all one which is limited especially, it is preferable that it can include a chain ester (or a linear ester) from the perspective of load characteristic. As for such a chain ester, the following organic solvents can be given: chain-like carbonates, which are represented by dimethyl carbonate, diethyl carbonate and ethyl methyl carbonate; ethyl acetate; and methyl propionate, for instance. It is also allowable to use one of these chain esters independently, or to mix two or more kinds of them to use. In particular, in order for the improvement in low-temperature characteristic, it is preferable that one of the aforementioned chain esters can account for 50% by volume or more in the entire organic solvent; especially, it is preferable that the one of the chain esters can account for 65% by volume or more in the entire organic solvent.

However, as for an organic solvent, rather than constituting it of one of the aforementioned chain esters alone, it is preferable to mix an ester whose permittivity is high (e.g., whose permittivity is 30 or more) with one of the aforementioned chain esters to use in order to intend the upgrade in discharged capacity. As for a specific example of such an ester, the following can be given: cyclic carbonates, which are represented by ethylene carbonate, propylene carbonate, butylene carbonate and vinylene carbonate; γ-butyrolactone; or ethylene glycol sulfite, and the like, for instance. In particular, cyclically-structured esters, such as ethylene carbonate and propylene carbonate, are preferable. It is preferable that such an ester whose permittivity is high can be included in an amount of 10% by volume or more in the entire organic solvent, especially 20% by volume or more therein, from the perspective of discharged capacity. Moreover, from the perspective of load characteristic, 40% by volume or less is more preferable, and 30% by volume or less is much more preferable.

As for an electrolyte to be dissolved in the organic solvent, one of the following can be used independently, or two or more kinds of them can be mixed to use: LiClO$_4$, LiPF$_6$, LiBF$_4$, LiAsF$_6$, LiSbF$_6$, LiCF$_3$SO$_3$, LiC$_4$F$_9$SO$_3$, LiCF$_3$CO$_2$, Li$_2$C$_2$F$_4$ (SO$_3$)$_2$, LiN(CF$_3$SO$_2$)$_2$, LiC(CF$_3$SO$_2$)$_3$, or LiC$_n$F$_{2n+1}$SO$_3$ (where "n"≥2), and the like, for instance. Among them, LiPF$_6$ or LiC$_4$F$_9$SO$_3$, and so forth, from which favorable charging/discharging characteristics are obtainable, can be used preferably.

Although a concentration of the electrolyte in the electrolytic solution is not at all one which is limited especially, it can preferably be from 0.3 to 1.7 mol/dm$^3$, especially from 0.4 to 1.5 mol/dm$^3$ approximately.

Moreover, in order to upgrade the safety or storage characteristic of battery, it is also allowable to make a non-aqueous electrolytic solution contain an aromatic compound. As for an aromatic compound, benzenes having an alkyl group, such as cyclohexylbenzene and t-butylbenzne, biphenyls, or fluorobenzenes can be used preferably.

As for a separator, it is allowable to use those which have sufficient strength, and besides which can retain electrolytic solutions in a large amount. From such a viewpoint, it is possible to use the following, which have thickness of from 5 to 50 μm, preferably: micro-porous films which are made of polypropylene, polyethylene or polyolefin, such as copolymers of propylene and ethylene; or nonwoven fabrics, and the like. In particular, in a case where such a thin separator as having from 5 to 20 μm in thickness is used, the characteristics of battery are likely to degrade during charging/discharging cycles or storage at high temperatures, and the safety declines as well. However, since a lithium-ion secondary battery, in which one of the above-mentioned composite oxides is used as the positive-electrode active material, is excellent in the stability and safety, it is possible to make the resulting batteries function stably even when such a thin separator is used.

A configuration of lithium-ion secondary batteries, which are constituted by means of the constituent elements as above, can be made into various sorts of those such as cylindrical types, laminated types and coin types. Even in a case where any one of the configurations is adopted, the separators are interposed between the positive electrodes and the negative electrodes to make electrode assemblies. And, these electrode assemblies are sealed hermetically in a battery case after connecting intervals from the resulting positive-electrode current-collector assemblies and negative-electrode current-collector assemblies up to the positive-electrode terminals and negative-electrode terminals, which lead to the outside, with leads for collecting electricity, and the like, and then impregnating these electrode assemblies with the aforementioned electrolytic solution, and thereby a lithium-ion secondary battery completes.

A lithium-ion secondary battery, in which one of the composite oxides being obtained by means of the production process according to the present invention as explained above is used, can be utilized suitably in the field of automobile in addition to the field of communication device or information-related device such as cellular phones and personal computers. For example, when vehicles have this lithium-ion secondary battery on-board, it is possible to employ the lithium-ion secondary battery as an electric power source for electric automobile.

So far, some of the embodiment modes of the production process for composite oxide, positive-electrode active material for lithium-ion secondary battery and lithium-ion secondary battery according to the present invention have been explained. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, the present invention will be explained in detail while giving specific examples of the production process for composite oxide, positive-electrode active material for lithium-ion secondary battery and lithium-ion secondary battery according to the present invention.

Example No. 1

Synthesis of $LiMnO_2$ 0.10-mol (i.e., 4.2-gram) lithium hydroxide monohydrate, $LiOH.H_2O$, was mixed with 0.15-mol (i.e., 10.3-gram) lithium nitrate, $LiNO_2$, to prepare a molten-salt raw material. To this, 0.020-mol (i.e., 5.8-gram) manganese nitrate hexahydrate, $Mn(NO_2)_2.6H_2O$, was added as a metallic-compound raw material, thereby preparing a raw-material mixture. That is, the molar ratio, namely, (Transition Element in Metallic-compound Raw Material)/(Lithium Metal in Molten-salt Raw Material), was 0.02 mol/0.25 mol=0.08. Moreover, since the targeted product was $LiMnO_2$, the other ratio, namely, (Li in Targeted Product)/(Li in Molten-salt Raw Material), was 0.02 mol/0.25 mol=0.08, assuming that all of Mn in the manganese nitrate was supplied to $LiMnO_2$.

The raw-material mixture was put in a crucible being made of mullite, and was then vacuum dried within a vacuum drier at 120° C. for 6 hours. Thereafter, the drier was returned back to the atmospheric pressure; the crucible, in which the raw-material mixture was held, was taken out and was then transferred immediately to an electric furnace, which had been heated to 300° C., and was further heated at 300° C. for 1 hour in air. On this occasion, the raw-material mixture was melted to turn into molten salt, and thereby a black-colored product deposited.

Next, the crucible, in which the molten salt was held, was taken out from the electric furnace, and was then cooled at room temperature. After the molten salt was cooled fully to solidify, the solidified molten salt was dissolved in water by immersing the molten salt as being held in the crucible into 200-mL ion-exchanged water and then stirring them therein. Since the black-colored product was insoluble in water, the water turned into a black-colored suspension liquid. When filtering the black-colored suspension liquid, a transparent filtrate was obtained, and a black-colored, solid filtered substance was obtained on the filter paper. The obtained filtered substance was further filtered while washing it fully with use of acetone. After vacuum drying the post-washing black-colored solid at 120° C. for 12 hours, it was pulverized using a mortar and pestle.

An X-ray diffraction (or XRD) measurement, in which the CuKα ray was used, was carried out for the obtained black-colored powder. The measurement result is shown in FIG. 1. According to the XRD measurement, it was understood that the obtained compound was $LiMnO_2$ that possessed an orthorhombic-system crystal structure.

Comparative Example No. 1

Synthesis of $LiMnO_2$ $LiOH.H_2O$, and $Mn_2O_3$ were mixed with each other so that they make a ratio, namely, Li/Mn=0.95 by atomic ratio. A heat treatment, in which this mixture was held at 300° C. for 4 hours in an argon atmosphere, was carried out. Thereafter, it was cooled gradually down to room temperature over a time period of 12 hours. The obtained product was pulverized using a mortar and pestle. These steps, namely, the heat treatment, the gradual cooling and the pulverizing, were carried out repeatedly at heat-treatment temperatures of 500° C. and 700° C.

The XRD measurement, in which the CuKα ray was used, was carried out for the obtained powder. Since peaks that were similar to those in FIG. 1 were obtained, it was understood that the generated compound was $LiMnO_2$ that possessed an orthorhombic-system crystal structure.

Comparative Example No. 2

Synthesis of $LiMnO_2$ 0.2-g $Mn_3O_4$ was admixed into a 3.5M $LiOH.H_2O$ aqueous solution, and then these are put into an autoclave, thereby carrying out a hydrothermal treatment at 170° C. for four days. After the hydrothermal treatment, the resulting deposit was filtered; then, the obtained deposit was washed with distilled water, was dried in a vacuum in which it was heated to 120° C., and was then pulverized using a mortar and pestle.

The XRD measurement, in which the CuKα ray was used, was carried out for the obtained powder. Since peaks that were similar to those in FIG. 1 were obtained, it was understood that the generated compound was $LiMnO_2$ that possessed an orthorhombic-system crystal structure.

Example No. 2

Synthesis of $LiMn_{0.95}Al_{0.05}O_2$ 0.10-mol (i.e., 4.2-gram) lithium hydroxide monohydrate, $LiOH.H_2O$, was mixed with 0.15-mol (i.e., 10.3-gram) lithium nitrate, $LiNO_3$, to prepare a molten-salt raw material. To this, a mixed nitrate aqueous solution was added as a metallic-compound raw material in an amount of 5.0 g to mix with those above, thereby preparing a raw-material mixture. Hereinafter, a preparation procedure for the mixed nitrate aqueous solution will be explained.

0.19-mol (i.e., 54.5-gram) $Mn(NO_3)_2.6H_2O$, and 0.01-mol (i.e., 3.8-gram) $Al(NO_3)_3.9H_2O$ were mixed with each other, and then 6-mL distilled water was added to them, thereby preparing a mixed nitrate aqueous solution with Mn:Al=0.95: 0.05.

Note that a transition-metal-element content per 5 grams of the obtained mixed nitrate aqueous solution was 0.016 mol. That is, the molar ratio, namely, (Transition Element in Metallic-compound Raw Material)/(Lithium Metal in Molten-salt Raw Material), was 0.016 mol/0.25 mol=0.064. Moreover, since the targeted product was $LiMn_{0.95}Al_{0.05}O_2$, the other ratio, namely, (Li in Targeted Product)/(Li in Molten-salt Raw Material), was 0.016 mol/0.25 mol=0.064, assuming that all of Mn in the manganese nitrate was supplied to $LiMn_{0.95}Al_{0.05}O_2$.

The raw-material mixture was put in a crucible being made of mullite, and was then vacuum dried within a vacuum drier at 120° C. for 12 hours. Thereafter, the drier was returned back to the atmospheric pressure; the crucible, in which the raw-material mixture was held, was taken out and was then transferred immediately to an electric furnace, which had been heated to 350° C., and was further heated at 350° C. for 1 hour in air. On this occasion, the raw-material mixture was melted to turn into molten salt, and thereby a black-colored product deposited.

Next, the crucible, in which the molten salt was held, was taken out from the electric furnace, and was then cooled at room temperature. After the molten salt was cooled fully to solidify, the solidified molten salt was dissolved in water by immersing the molten salt as being held in the crucible into 200-mL ion-exchanged water and then stirring them therein. Since the black-colored product was insoluble in water, the water turned into a black-colored suspension liquid. When filtering the black-colored suspension liquid, a transparent filtrate was obtained, and a black-colored, solid filtered substance was obtained on the filter paper. The obtained filtered substance was further filtered while washing it fully with use of ion-exchanged water. After vacuum drying the post-washing black-colored solid at 120° C. for 12 hours, it was pulverized using a mortar and pestle.

The X-ray diffraction measurement, in which the CuK α ray was used, was carried out for the obtained black-colored powder. Since peaks that were similar to those in FIG. 1 were obtained, it was understood that it was an $LiMnO_2$-type composite oxide that possessed an orthorhombic-system crystal structure. Moreover, according to an ICP analysis and analysis on an average valency of Mn by means of oxidation-reduction titration, it was ascertained that the composition was $LiMn_{0.95}Al_{0.05}O_2$.

Note that the evaluation on the valency of Mn was carried out as follows. A sample was taken in an amount of 0.05 g in an Erlenmeyer flask; a 1% sodium oxalate solution was added thereto in an amount of 40 mL accurately; $H_2SO_4$ was further added thereto in an amount of 50 mL; and then the sample was dissolved within a 90° C. water bath in a nitrogen-gas atmosphere. To the resulting mixture solution, 0.1N potassium permanganate was dropped to titrate it, and the titration was carried out until an end point at which the mixture solution changed the color to a faint rouge-like color (i.e., a titer, "V1"). Meanwhile, another 1% sodium oxalate solution was taken in an amount of 20 mL accurately in another flask, and another 0.1N potassium permanganate was dropped to titrate the resultant mixture solution in the same manner as aforementioned until the end point (i.e., another titer, "V2"). According to the following equation, an amount of oxalic acid, which was consumed when Mn with higher number of valence was reduced to $Mn^{2+}$, was calculated as an oxygen amount (or active-oxygen amount) from the "V1" and "V2".

(Active-oxygen Amount) (%)=[{(2×"V2"−"V1")× 0.00080}/(Amount of Sample)]×100

And, an averaged valency of Mn was calculated from an Mn amount in the sample (e.g., a measured value by ICP analysis) and the resulting active-oxygen amount.

Observation of Primary Particles

Regarding the composite oxides according to Example No. 1, Example No. 2, Comparative Example No. 1 and Comparative Example No. 2, their primary particles were observed using a transmission electron microscope (or TEM) for the examples, whereas using a scanning electron microscope (or SEM) for the comparative examples. From the resulting TEM images and SEM images, particle diameters of the primary particles were measured. In measuring the particle diameters, a maximum length in a case where one of the particles was held between two parallel lines was measured, and it was measured for the particles in a quantity of 25 pieces to obtain the number average value. The measurement results are given in Table 1. Moreover, b-axis-direction particle diameters, which were calculated from a half-value width of the (010) peak in each of $LiMnO_2$ at around 15.4 degrees in the XRD patterns, are also given in Table 1. Note that no such a calculation was done for the composite oxides according to the comparative examples because it was believed that their half-value widths of the (010) peak were small and their crystallite sizes were 100 nm or more.

TABLE 1

| | Particle Dia. (nm) | Half-value Width | b-axis-direction Particle Dia. (nm) Found from Half-value Width |
|---|---|---|---|
| Ex. No. 1 | 20 | 0.58 | 15 |
| Ex. No. 2 | 50 | 0.256 | 39 |
| Comp. Ex. No. 1 | 1000 or more | — | — |
| Comp. Ex. No. 2 | 200 | — | — |

The composite oxides according to Example No. 1 and Example No. 2 were fine particles whose particle diameters were 100 nm or less. When observing the composite oxides, which had been obtained in Example No. 1 and Example No. 2, by means of TEM, any of the particles were a single crystal, respectively, although not shown in the drawing. Consequently, the particle diameters being calculated from the half-value widths became values that were on the same order as those of the primary-particle diameters that were measured from the TEM images. On the other hand, in the composite oxides according to Comparative Example No. 1 and Comparative Example No. 2, the primary particles were a polycrystalline body, respectively, and were very large particles whose particle diameters were 2 μm or more.

Lithium-Ion Secondary Battery $LiMnO_2$, the composite oxide that had been obtained in Example No. 1 or Comparative Example No. 1, was used as a positive-electrode active material, thereby making a lithium-ion secondary battery.

The following were mixed one another: 50-part-by-mass $LiMnO_2$ serving as a positive-electrode active material; 40-part-by-mass acetylene black (or AB) serving as a conductive additive; and 10-part-by-mass polytetrafluoroethylene (or PTEF) serving as a binding agent (or binder), and then they were dispersed in N-methyl-2-pyrrolidone serving as a solvent, thereby preparing a slurry. Subsequently, this slurry was coated onto an aluminum foil, namely, a current collector, and was then dried thereon. Thereafter, the slurry was press rolled to 60 μm in thickness, and then the coated aluminum foil was punched out to a size of φ 11 mm in diameter, thereby obtaining a positive electrode. Moreover, metallic lithium with φ 14 mm and 200 μm in thickness was made into a negative electrode to be faced to the positive electrode.

Microporous polyethylene films with 20 μm in thickness serving as separators were held between the positive electrodes and the negative electrodes to make them into an electrode-assembly battery. This electrode-assembly battery was accommodated in a battery case (e.g., CR2032, a coin cell produced by HOHSEN Co., Ltd.). Moreover, a non-aqueous electrolyte, in which $LiPF_6$ was dissolved in a concentration of 1.0 mol/L into a mixed solvent in which ethylene carbonate and diethyl carbonate were mixed in a volumetric ratio of 1:2, was injected into the battery case, thereby obtaining a lithium-ion secondary battery.

Evaluation

Regarding the above-mentioned lithium-ion secondary batteries, a charging/discharging test was carried out at room temperature for 50 cycles. The results are illustrated in FIG. 2 through FIG. 4, respectively.

Figure 2:
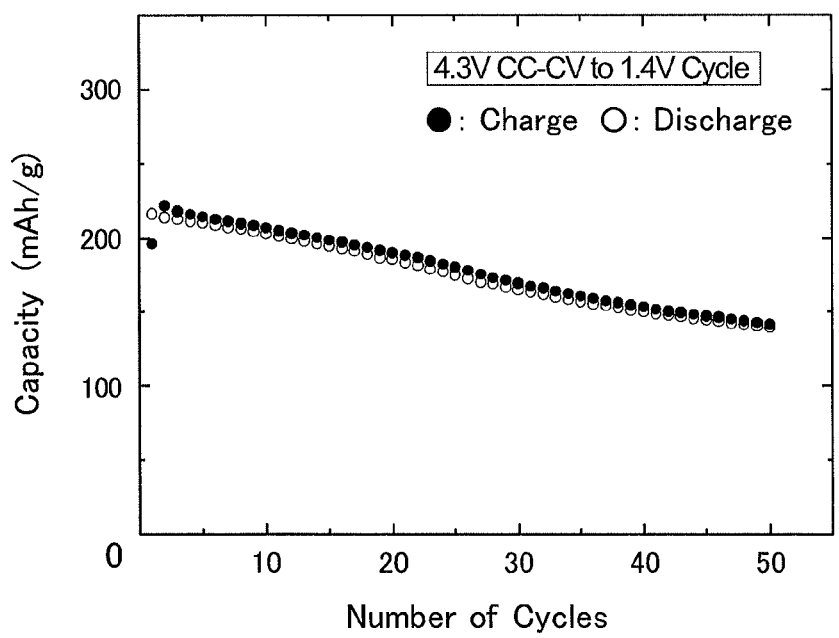
FIG. 2 is a graph for illustrating a cyclability of a lithium-ion secondary battery in which a composite oxide being produced by means a production process for composite oxide according to the present invention was used as the positive-electrode active material.

FIG. 2 is a graph that shows a cyclability of the lithium-ion secondary battery in which the composite oxide according to Example No. 1 was used as the positive-electrode active material. In the charging/discharging test, after a CCCV charging (i.e., constant-current and constant-voltage charging) operation was carried out at 0.2 C up to 4.3 V, a CC discharging operation was carried out at 0.2 C down to 1.4 V. After the second cycle and later on, the charging and discharging operations were likewise carried out repeatedly up to the 50th cycle in the same manner as above. The lithium-ion secondary battery, in which the composite oxide according to Example No. 1 was used as the positive-electrode active material, had a sufficient cyclability because the capacity maintenance ratio was about 65% at the 50th cycle.

Figure 3:
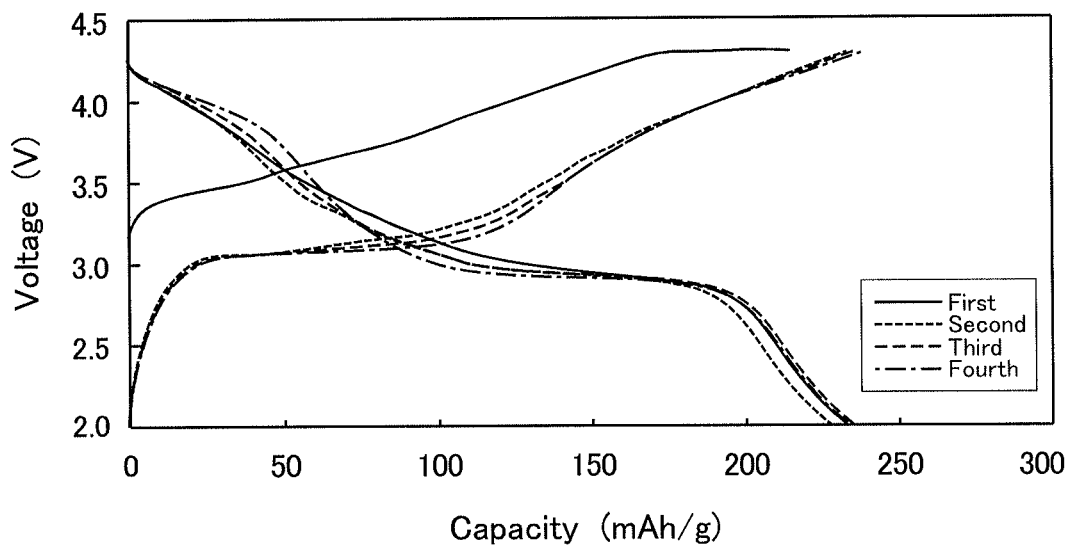
FIG. 3 is a graph for illustrating charging/discharging characteristics of a lithium-ion secondary battery in which a composite oxide being produced by means a production process for composite oxide according to the present invention was used as the positive-electrode active material.
Figure 4:
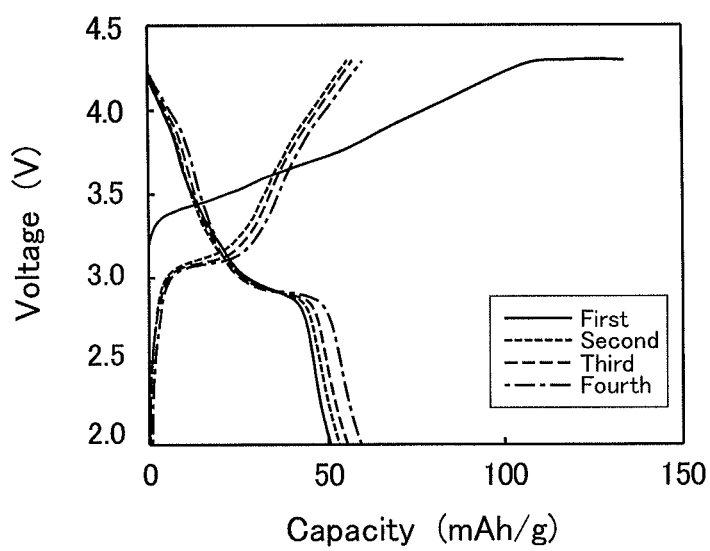
FIG. 4 is a graph for illustrating charging/discharging characteristics of a lithium-ion secondary battery in which a composite oxide being produced by means a conventional production process was used as the positive-electrode active material.

Moreover, FIG. 3 and FIG. 4 are graphs that respectively show a charging/discharging characteristic of the lithium-ion secondary battery in which the composite oxide according to Example No. 1 or Comparative Example No. 1 was used as the positive-electrode active material. In the charging/discharging test, after a CCCV charging (i.e., constant-current and constant-voltage charging) operation was carried out at 0.2 C up to 4.3 V, a CC discharging operation was carried out at 0.2 C down to 2.0 V. After the second cycle and later on, the charging and discharging operations were likewise carried out repeatedly up to the 50th cycle in the same manner as above. Note that a condition for terminating the constant-voltage charging operation was set at an electric-current value of 0.02 C.

In the battery according to Comparative Example No. 1, 15 cycles were needed to reach the maximum discharged capacity. On the other hand, in the battery according Example No. 1, large capacities were exhibited since the initial discharging operation. This is believed to be affected by the fact that the very minute $LiMnO_2$ particles were synthesized. Note that, in the battery according to Example No. 1, the capacity became larger during the discharging operation than during the charging operation at the first cycle, for Li ions were taken in into the $LiMnO_2$ particles excessively during the discharging operation at the first cycle. This is believed to be as follows: the $LiMnO_2$ particles had larger surface areas because they were nano-sized; and hence a great number of Li ions could adsorb onto their surfaces.

The invention claimed is:

1. A production process for composite oxide being characterized in that:
    it is a production process for composite oxide being expressed by a compositional formula: $LiMn_{1-x}A_xO_2$, where "A" is one or more kinds of metallic elements other than Mn; $0 \leq "x" < 1$; and an averaged oxidation number of Mn falls in a range of from 2.8 to 3.2;
    said composite oxide is obtained via the following:
    a raw-material mixture preparation step of preparing a raw-material mixture by mixing a metallic-compound raw material and a molten-salt raw material with each other,
    the metallic-compound raw material at least including an Mn-containing nitrate that includes one or more kinds of metallic elements in which Mn is essential,
    the molten-salt raw material including lithium hydroxide and lithium nitrate, and exhibiting a proportion of the lithium nitrate with respect to the lithium hydroxide, Lithium Nitrate/Lithium Hydroxide, that falls in a range of from 1.2 to 3 by molar ratio;
    a molten reaction step of reacting said raw-material mixture at 500° C. or less by melting it; and
    a recovery step of recovering said composite oxide being generated from said raw-material mixture that has undergone the reaction,
    wherein the molten-salt raw material does not include lithium peroxide; and
    said composite oxide has a crystal structure belonging to an orthorhombic-system space group.

2. The production process for composite oxide as set forth in claim 1, wherein said metallic-compound raw material further includes a second nitrate including one or more kinds of metallic elements other than Mn.

3. The production process for composite oxide, wherein a mixed-nitrate aqueous-solution preparation step, in which an aqueous solution of nitrate including at least two kinds of metallic elements is prepared, is further carried out before the raw-material mixture preparation step in the production process for composite oxide as set forth in claim 1, and then said metallic-compound raw material including the aqueous solution is employed at the raw-material mixture preparation step.

4. The production process for composite oxide as set forth in claim 1, wherein said raw-material mixture exhibits a proportion of the metallic elements, which are included in said metallic-compound raw material, with respect to lithium metal, which is included in said molten-salt raw material, Metallic Elements in Metallic-compound Raw Material/Lithium Metal in Molten-salt Raw Material, the proportion falling in a range of from 0.01 to 0.2 by molar ratio.

5. The production process for composite oxide as set forth in claim 1 further including a proton substitution step, in which a part of Li in said composite oxide is substituted by proton (H), after said recovery step.

\* \* \* \* \*